US006315306B1

(12) United States Patent
Fernie et al.

(10) Patent No.: US 6,315,306 B1
(45) Date of Patent: Nov. 13, 2001

(54) NESTABLE WHEELCHAIR

(75) Inventors: Geoffrey Roy Fernie, Islington; Philip Joseph Wilcox, Toronto; Proctor Weeks May, Rexdale, all of (CA)

(73) Assignee: CSIA Research Foundation, Toronto (CA)

(*) Notice: Subject to any disclaimer, the term of this patent is extended or adjusted under 35 U.S.C. 154(b) by 0 days.

(21) Appl. No.: 09/573,887

(22) Filed: May 19, 2000

Related U.S. Application Data

(63) Continuation of application No. 09/342,110, filed on Jun. 29, 1999, now abandoned, which is a continuation of application No. 08/928,654, filed on Sep. 12, 1997, now abandoned.

(51) Int. Cl.[7] .......................................................... B62B 5/04

(52) U.S. Cl. ............................... 280/33.991; 280/33.992; 280/33.974

(58) Field of Search ......................... 280/33.994, 33.991, 280/33.992, 33.995, 33.996, 47.34, 47.35; 188/19

(56) References Cited

U.S. PATENT DOCUMENTS 3,015,494 1/1962 Fosbrook, Sr. .
3,361,438 1/1968 Davis .
4,084,663 4/1978 Haley .
4,484,755 11/1984 Houston .
4,733,877 3/1988 Pastien .
4,840,388 * 6/1989 Doughty .......................... 280/33.994
4,976,447 * 12/1990 Batson ............................ 280/33.994
5,288,089 * 2/1994 Bowers et al. .................. 280/33.994
5,370,408 * 12/1994 Eagan .............................. 280/33.994
5,417,300 5/1995 Shultz .

FOREIGN PATENT DOCUMENTS

WO 93/01077 1/1993 (WO) .

* cited by examiner

*Primary Examiner*—Richard M. Camby
(74) *Attorney, Agent, or Firm*—Philip C. Mendes da Costa; Bereskin & Parr

(57) ABSTRACT

A nestable wheelchair of the type in which a seat portion of one chair can be slid underneath the seat portion of a next adjacent chair, for nesting, and having side frames supporting the seat, the side frames being further apart at the rear and closer together at the front of the chair, and, a rear support frame extending upwardly and downwardly behind the side frame, the rear support frame having a handle at the upper end for pushing the chair, lower bracing frames extending from forward extensions of the side frames to the rear support frame, with their forward width spacing being less than their rearward width spacing, forward wheels mounted on the forward ends of said lower bracing frames, and rearward wheels mounted on rearward portions of the lower bracing frames, longitudinal bars extending parallel to the lower bracing frames at a predetermined height, permitting forward portions of a rearward chair to be inserted beneath the bar of a nest adjacent forward chair, and providing a lifting action so as to lift the rear wheels of the forward chair off the floor surface.

19 Claims, 5 Drawing Sheets

NESTABLE WHEELCHAIR

This is a continuation of U.S. Patent application Ser. No. 09/342,110 filed Jun. 29, 1999 now abandoned, which is a continuation of U.S. patent application Ser. No. 08/928,654 filed Sep. 12, 1997 now abandoned.

FIELD OF THE INVENTION

The invention relates to wheelchairs for physically challenged persons, and in particular to wheelchairs for use in institutions such as health care institutions, and large public buildings and facilities such as airport terminals and the like and in particular to such wheelchairs which are capable of nesting one behind the other for storage, and also for moving from place to place, when not actually carrying a person.

BACKGROUND OF THE INVENTION

The moving of physically challenged persons in public institutions such as hospitals and health care facilities, and also in public buildings such as airport terminals and the like, almost always involves the use of a wheelchair. A great variety of wheelchairs are known, some of which are foldable to reduce storage space, some of which are designed for hand operation by the challenged person, and some of which are motorized and so on.

All of these wheelchairs have their application for a particular purpose. However, the moving of physically challenged persons from place to place in a health care facility or a large public building presents a somewhat different set of problems. In the first place, the distances to be travelled may be considerable, and the challenged person may not be able to operate their own wheelchair along those distances. The corridor and door spaces within such buildings may restrict the width of the wheelchair which can conveniently be used for transporting the challenged person. Consequently, for all of these reasons, wheelchairs operated by hand or electrically powered wheelchairs are generally not suitable for these purposes. In addition, they represent a very considerable cost per unit, and they are also difficult to store when not required.

It must also be borne in mind that in some such facilities particularly such as airport facilities, it may be desirable to move a number of challenged persons from one place to another, and then to transfer them to some other form of support. In this case, the wheelchair then becomes redundant and must be stored. In addition, ideally it should be returned to an area where it can easily be accessed for use with another challenged person.

Wheelchairs such as are used at present for these purposes are generally such that they must be returned one at a time to the location from which they were originally retrieved, and this ties up care personnel, who may have numerous other duties to perform.

In addition, in most of these facilities, the particular route to be taken for transporting the challenged person, may only be known to a care person and may not be known to the challenged person. Consequently self-propelled wheelchairs are of little use in these facilities.

Clearly it is desirable for use in these facilities to provide a wheelchair which can simply be pushed by a care person who can then move the challenged person at a good pace from one place to another.

Ideally such wheelchairs should be capable of being transported empty, in a group by a single care person so that a single care person may transport several chairs after use, from one place back to a central location.

It is also desirable to provide braking, since a challenged person sitting in such a chair has no control over the chair, and unless a care person is actually holding the chair it may roll free. A braking system which is automatic and self-operating is therefore considered essential in this type of chair.

It is also highly desirable to provide such chairs for a facility for nesting one behind the other. In this way a care person can nest a group of chairs together and then can push them as a group from one location to another.

Preferably such chairs should also provide a means for carrying a limited amount of luggage and in the case of health care institutions they should be capable of carrying patient records and like papers.

BRIEF SUMMARY OF THE INVENTION

With a view to providing a wheelchair satisfying the foregoing desirable characteristics, the invention comprises a nest able wheelchair of the type in which a seat portion of one chair can be slid underneath the seat portion of a next adjacent chair, for nesting, and comprising side frame members supporting said seat, said side frame members defining a rear width and a forward width and in which the forward width is less than the rearward width, and a forwardly and downwardly sloping seat surface, rear support frame members extending upwardly and downwardly relative to said side frame members, said rear support frame members having handle means at the upper end for pushing the chair, and lower bracing frames extending from forward extensions of said side frame members to lower portions of said rear support frame members, and similarly defining a rearward width and a forward width, with the forward width being less than the rearward width, forward wheels mounted on the forward ends of said lower bracing frames, and rearward wheels being mounted on rearward portions of said lower bracing frames, and, bar means extending across said lower bracing frames at a predetermined height, ramp means located between said lower bracing frames and being adapted to slide beneath said bar means of a next forward chair, the tapering shape of the side frame members and the bracing frames permitting forward portions of a rearward chair to be inserted beneath the seat and the bar means of a next adjacent forward chair, and engagement of the bar means by the ramp means providing a lifting action, thereby lifting said rear wheels of said forward chair off the floor surface.

A further feature of the invention is the provision of automatic braking means, which are self-engaging with the rear wheels, and a brake release mechanism adjacent to the upper end of the rear frame member, so that it can be grasped by the care person pushing the chair, to release the brakes from the back wheels.

The invention further contemplates the provision of a pair of anti-tipping rollers, mounted on rearward extensions of the lower frames and extending rearwardly of the rear wheels. These rollers enable the chair to be tipped backwards, checking it at a predetermined angle, so as the front wheels can be lifted over an obstacle.

The invention further provides that the contact bar extending between the two lower bracing frames is incorporated in a luggage rack, the luggage rack being located more or less beneath the seat, so that small items of personal hand luggage can be placed thereon, while the care person is pushing the chair.

The invention also provides, where required, a storage rack behind the rear frame members, for containing papers, reports and the like.

Arms are provided which extend forwardly from the rear frame members and can be folded upwardly for easy side entrance and exit from the chair, and foot rests are provided on the lower forward ends of the side frame members.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

A BRIEF DESCRIPTION OF THE DRAWINGS

DESCRIPTION OF THE PREFERRED EMBODIMENT

As described above, the invention relates generally to a wheelchair of the type used for moving physically challenged persons about a large facility such as a hospital health care facility, public space, airport terminal or the like, and in particular where space is limited and restricts the use of conventional wheelchairs, and where distances are considerable requiring transport at a certain pace, and in which movement directions may not be familiar to the challenged person. In general, such chairs are intended to be used by care persons pushing the physically challenged person from place to place, or from point to point after which the physically challenged person will be transferred from the chair to some other form of seating, or perhaps to a bed, or to a bath, or some special treatment facility. Such chairs are generally speaking required to be stored at a central point or at convenient points around the facility, so that they are readily accessible to care persons. For this reason it is desirable that such chairs will be moved around, when empty, in groups nested together so that they may be returned to where they came from.

It is for these reasons that the invention relates generally to a nest able wheelchair, i.e. a wheelchair which is capable of being nested within the rear portion of the next forward adjacent wheelchair in a line of wheelchairs, for convenience of moving the chairs around when empty.

Figure 1:
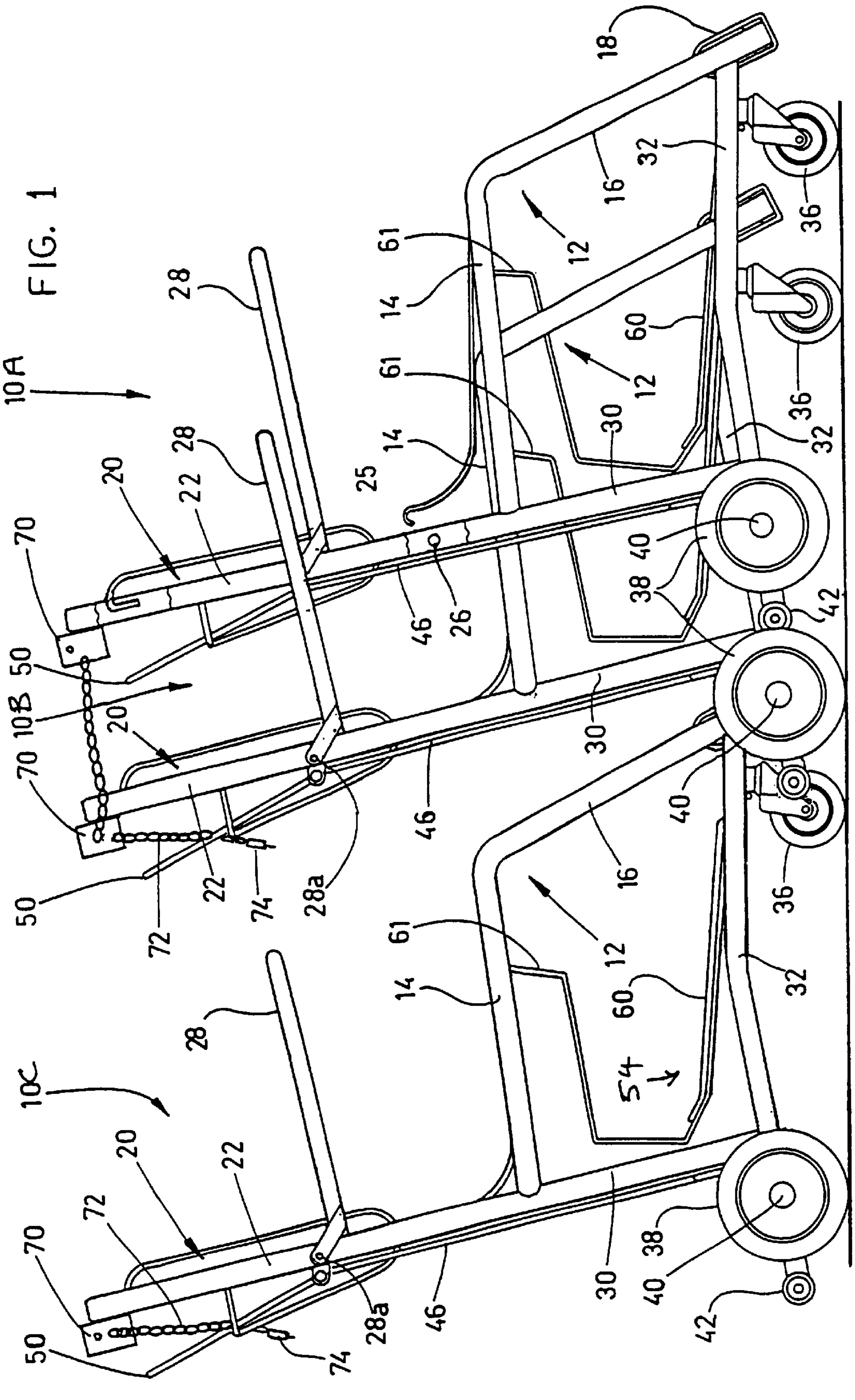
FIG. 1 is a side elevation illustrating two chairs nested together and a third chair, about to be nested with the second.

Referring first of all to FIG. 1, it will be seen that the invention is there illustrated in the form of two nest able wheelchairs indicated as 10A and 10B, and a third chair 10C is shown in phantom.

The chairs 10A and 10B are shown fully nested together, and the third chair is shown behind the chair 10D and is ready to be nested with chair 10B.

The plurality of such chairs can be nested one behind the other in this way, and a person can then push the group of nested chairs about simply by grasping the handle of the rearward chair.

As shown in FIGS. 2 through 5, each of the chairs 10A, 10B, 10C etc. comprise a pair of generally L-shaped side frame members 12, having generally forwardly and downwardly sloping seat supporting portions 14, and downwardly angled foot portions 16.

Figure 2:
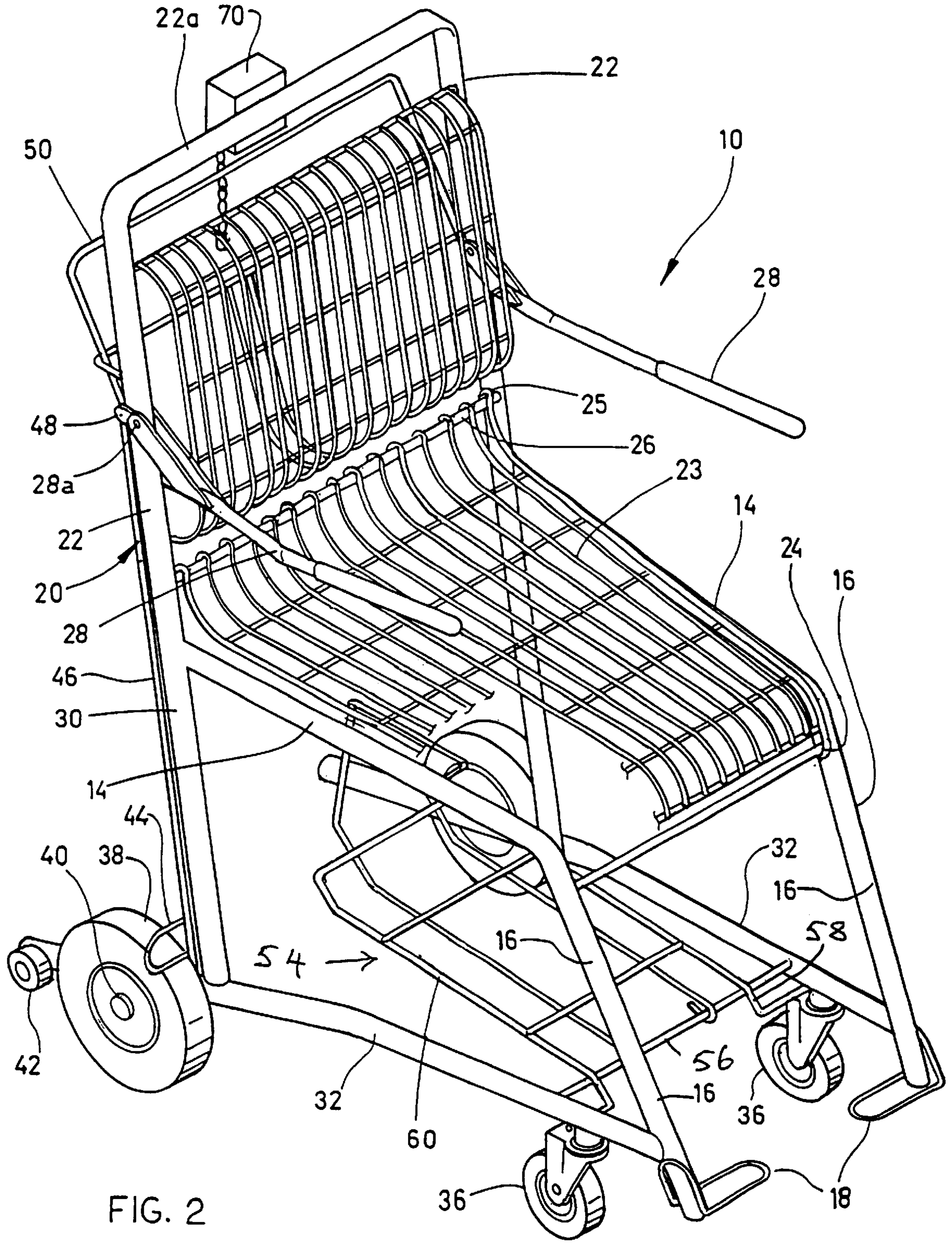
FIG. 2 is a perspective illustration of a chair illustrating the invention.

The side frames 12 have a predetermined spacing S between them at their rearward ends, and a reduced spacing S at their forward ends, therefore defining in plan a generally tapering seat shape. (FIG. 2)

The width of the rearward portion indicated as S is generally wide enough to provide comfortable seating for the challenged person, and the reduced width front portion S will provide adequate support for the legs.

Foldable foot rests 18 are located on the lower ends of the forward portions 16.

In order to provide a seat back and support, a rearward substantially vertical support frame 20 is provided, having upper back supporting portions 22, and a cross-bar handle 22A extending between the upper ends of the back supporting portions 22. Suitable seat back material, in this case of wire mesh, is supported by the back supporting portions 22, suitable seating material 23 in this case of wire rods is supported between the side frames 14. The wire rod material 23, is hinged along its forward edge to side members 14, by hinges 24. Along the rearward ends of the wire rod material 23, hooks 25 are formed. Hooks 25 engage a cross-bar 26 extending between side members 22 of the rear frame.

In this way the seating material 23 can be raised upwardly swinging around the hinges 24 and when it drops back, the hooks 25 will engage the rod 26. In this way general utility type of seat and back surfaces are provided for these chairs, which will be used generally speaking for relatively short spaces of time, and may be used by many persons, so that the finish of the surfaces may be utilitarian, and functional and provide for a long, useful life.

Arm rests 28 are swingably mounted by hinges 28A on the back frames 22, so that the arm rests 28 may be swung upwardly out of the way, or may be swung downwardly into the more or less horizontal position as shown for support, where they are held and cannot swing further.

This greatly facilitates the moving of a challenged person into and out of the chair from the side.

The rear frames 20 are extended downwardly as at 30, to provide rearward support for a chair. A pair of lower bracing frames 32 extend from the lower ends of forward frames 16 to the lower ends of the lower portions 30 of the rear frames.

Bracing frames 32 extend rearwardly of rear frames 30, as at 34. The bracing frames define a narrower forward spacing, and a wider rearward spacing. In this way a seat of a rearward chair may be slid beneath the seat of a forward chair in the space defined by side frames 14 and bracing frames 32, for nesting.

Figure 6:
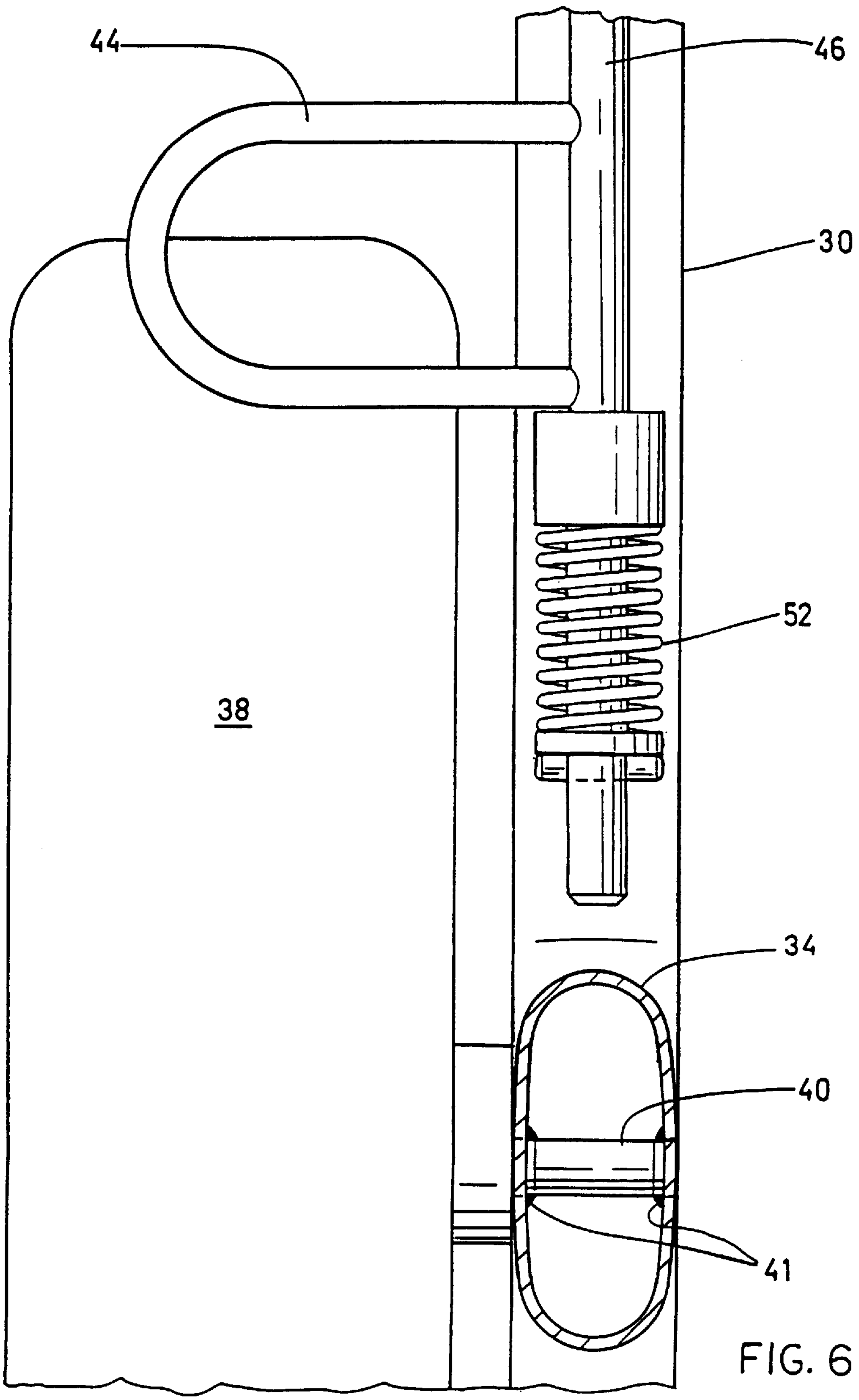
FIG. 6 is a rear-elevation of a portion of one chair.

Front wheels, having a caster action indicated as 36 are provided at the forward ends of the bracing frame 32. Rear wheels 38 are provided just rearwardly of the junction between the lower rear frame 30 and the bracing frame 32. It will be noted that the two rear wheels 38 are separately journalled on individual axles 40 welded at 41 (FIG. 6) in extensions 34, so that there is a clear space between the two rearward portions 34 of the bracing frames 32.

This is important for achieving the nesting features of the invention.

In order to enable the chairs to negotiate small obstacles, and to prevent tipping rearwardly, anti-tipping rollers 42 are mounted on the rearward ends of the extensions 34. This will enable a care person pushing the chair to tip the chair slightly backwards so as to raise the front wheels over a small obstruction, if it is necessary, without danger of the chair over tipping backwards.

In order to provide stability and security for the chair, braking means are provided for the back wheels 38. The braking means comprise in this embodiment, generally loop shaped brake bars 44, which moved upwardly and downwardly and engage the upper surfaces of the wheels 38 and provide a braking action.

In order to operate the brakes, the bar loops 44 are mounted on vertical brake rods 46. Brake rods 46 extend upwardly to operating links 48 mounted on the upper portions 22 of the back support 20. The links 48 are pivotally mounted to the back support portions 22. They are operated by means of the generally D-shaped operating bar 50 adjacent to handle 24. Bar 50 is secured as by welding or any other suitable means to the links 48.

Springs 52 urge the rods 46 downwardly so as to maintain the brake loops 44 in engagement with the wheels so that the brakes are normally "on".

When the care person wishes to move the chair, he or she will then simply grasp the brake lever 50 and push it forward against the handle or push bar 24. This will then raise the links 48, lifting the brake loops 44 away from the wheels 38, thereby releasing the wheels 38 for rolling. Releasing of the bar 50 will cause the springs to immediately reapply the brakes.

Figure 3:
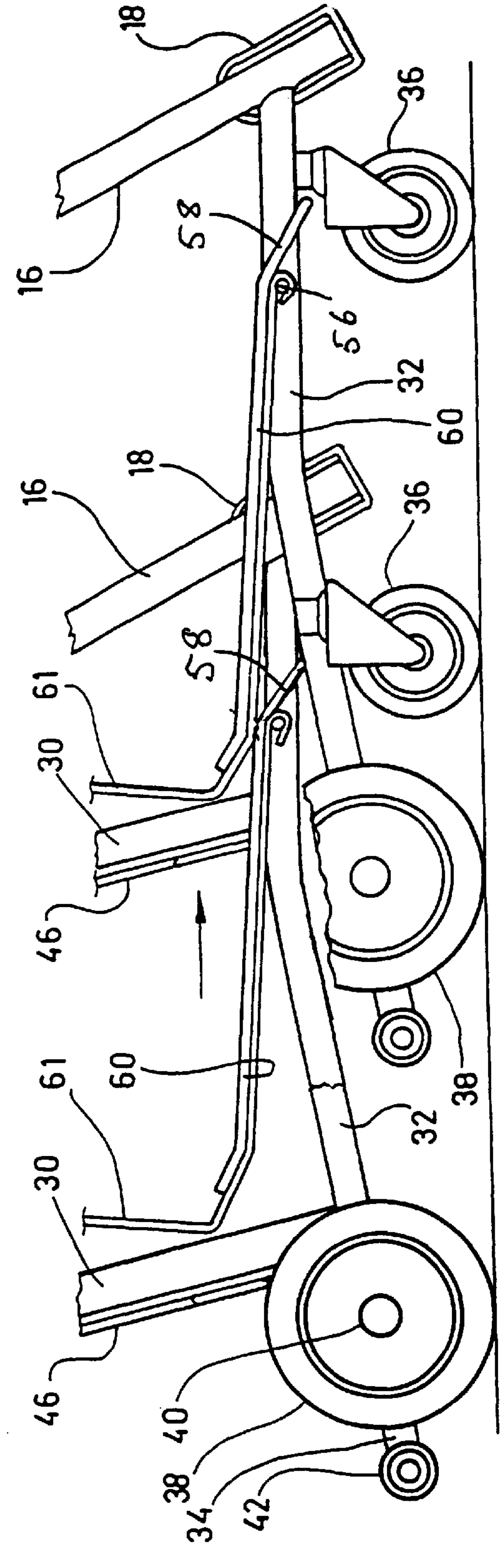
FIG. 3 and 4 are side-elevational views of portions of two chairs, showing the forward chair being lifted by the rearward chair as the rearward chair nests inside the forward chair; and, FIG. 5 is a top plan view of the chair of FIG. 1, showing the tapering side frames and lower frames and seat.
Figure 4:
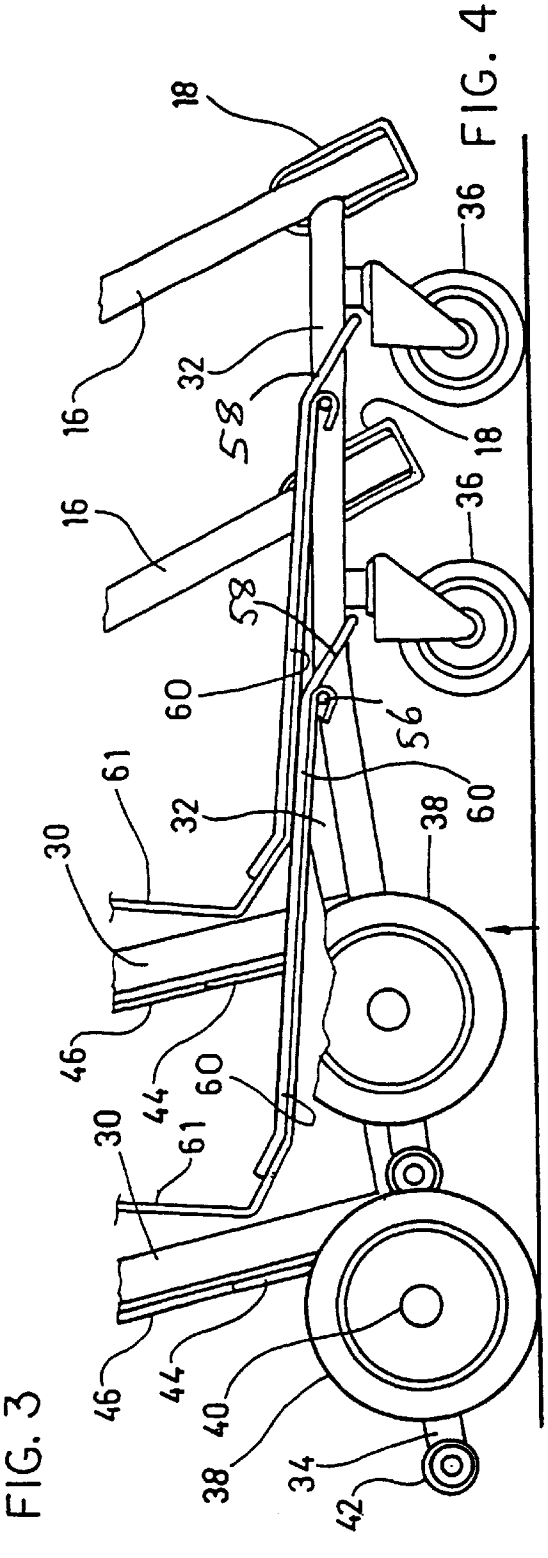
Figure 5:
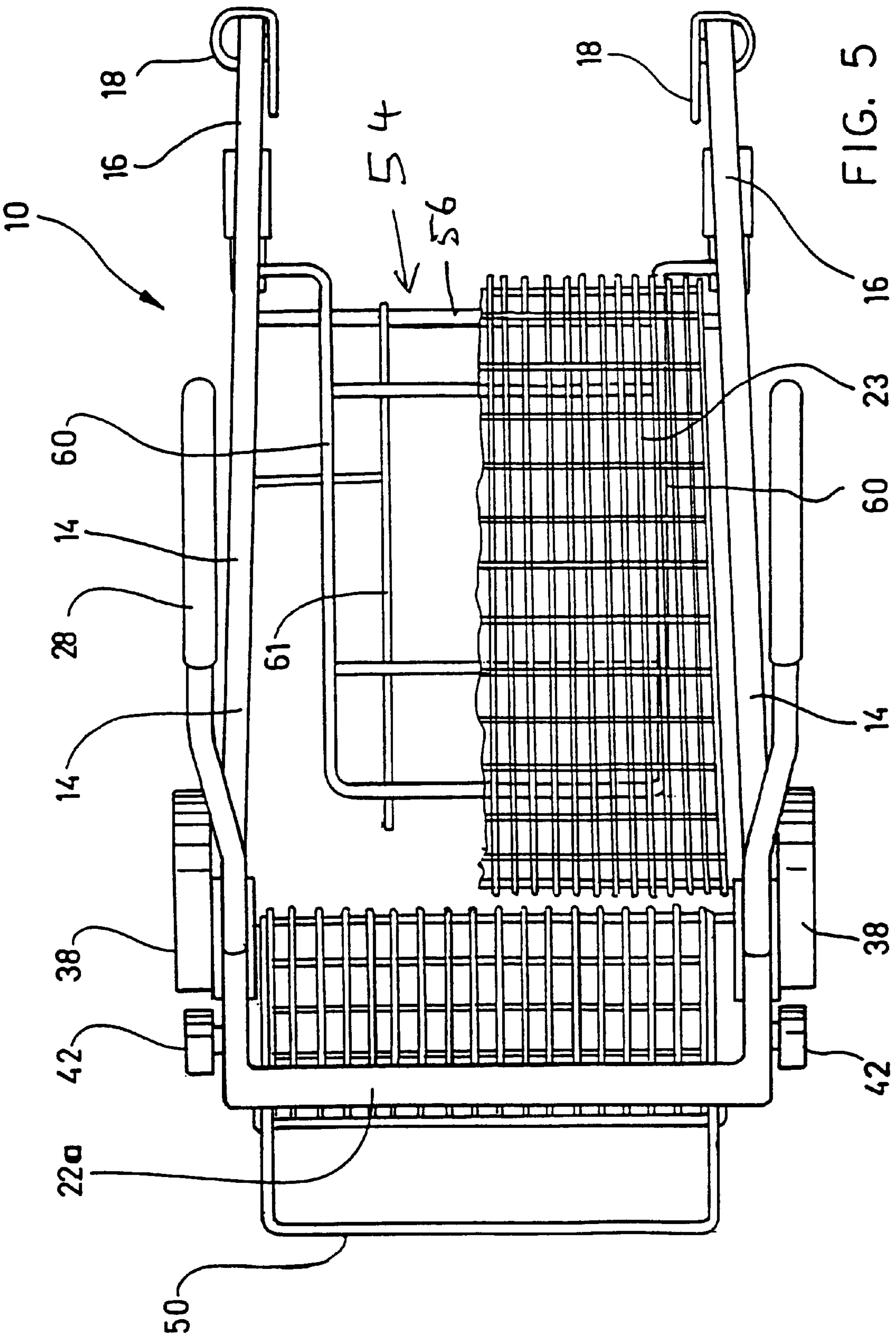

The nesting features of the invention are best understood with respect to FIGS. 1,3, and 4.

One of the considerations to be dealt with in the nesting chairs, is the fact that each chair is provided with its own braking mechanism.

If the chairs are nested, and if the braking mechanisms are all left operative so that the rear wheels cannot move, then moving a group of chairs nested one behind the other as shown in FIG. 1, will present problems.

As best shown in FIG. 3, the invention deals with this problem by the fact that each rearward nested chair 10B, 10C etc., when it is nested, operates to elevate the rear wheels 38 of the chair in front of it.

In this way, all of the nested chairs with the exception of the rearmost chair are slightly elevated or tilted so that their rear wheels do not touch the floor. Then all the operator has to do in order to wheel a group of nested chairs is simply to grasp the handle 24 and the brake bar 50 of the rearmost chair and push them all in one group.

The action whereby this elevation takes place will be described as follows.

Each chair 10A, 10B etc. is provided with a luggage rack 54, The rack 54 extends between the bracing bars 32—32.

The forward edge of the rack 54 is attached to the cross bar 56.

Each luggage rack has a mid-section designed for carrying luggage. Each luggage rack 54 has a forward ramp section 58 angled downwardly.

Rack 54 has two longitudinal bars 60 extending lengthwise.

A pair of connector rods 61 extend from beneath bars 60 upwardly to the underside of the seating wires 23. Rods 61 support and secure the luggage rack against movement.

The forward ramp portion 58 of the luggage rack 54 is designed to slide beneath the luggage rack 54 of the chair in front, during the nesting operation. When the ramp 58 of one chair slides beneath rack 54 of another chair in front, this will cause the chair 23 to be raised upwardly.

As the chair behind is pushed further into the space between the bracing bars 32, the luggage rack will come into contact with the longitudinal bars 61, and will continue to raise the rear of the chair. Continued pushing of the rearward chair into the space between the bracing bars will cause further elevation of the forward chair and will cause the rear wheels of 38 of the chair to be raised slightly off the floor, tilting the chair forwardly so that it rests only on its front wheels.

This function will continue each time a further chair is nested from the rear of the chairs in front.

Also as a function of the nesting of the chairs together, the seat bars 14, and their associated seating wires 23, will come into contact with the underside of the seating wires 23 of the next forward chair. This will cause those seating wires to raise upwardly so that the hooks 25 become disengaged from the rods 26 (FIG. 1). This function simply enables the rearward chair to enter fully into the nesting engagement. When the rearmost chair is removed, then the seating wires 23 will drop downwardly and the hooks 25 will engage on the rod 26.

In the end there may be six or eight or more nested chairs, in which the front wheels 36 of each nested chair are in contact with the floor, but in which all of the rear wheels 38, with the exception of the rearmost chair, are raised off the floor.

The rearmost chair of course, has its rear wheels 38 in contact with the floor.

All that is then required to move the entire group of nested chairs is for the operator to grasp the cross-bar 22A and brake bar 50, and release the brakes loops 44 off the wheels 38 of the rearmost chair and then the entire group of nested chairs is free to roll, The nest or group of chairs may then simply be returned to a central point from where chairs may be drawn as needed.

In order to release a chair from the group all that is required is to grasp the handle 22A and the brake bar 50, and pull the rear most chair out of the nest.

That chair can be wheeled about to wherever it is needed. The remaining group of chairs however, will remain fixed in position, since the rear wheel 38 of the rearmost chair left in that group will be in contact with the floor and the brakes will be operating on the rear wheels 38 of that chair. Consequently the group of chairs is still not free to move in any direction.

In one form of chair, it may be desirable to provide for a lock means on each chair indicated generally as 70, and a flexible interlock chain 72 and key 74. The lock 70 may, for example, be coin operated. In this way the chairs when nested may all be locked together, and a person wishing to use a chair may simply insert a coin to release the endmost chair.

The foregoing is a description of a preferred embodiment of the invention which is given here by way of example only. The invention is not to be taken as limited to any of the specific features as described, but comprehends all such variations thereof as come within the scope of the appended claims.

We claim:

1. A nestable wheelchair adapted for nesting in a second such nestable wheelchair, said nestable wheelchair comprising:

(a) a seat;

(b) a frame for supporting said seat, said frame defining a rear width and a forward width, and in which the forward width is less than the rear width;

(c) at least one front wheel mounted to a forward end of said frame;

(d) rear wheels mounted to said frame;

(e) a handle; and (f) a brake for controlling the operation of at least one of said rear wheels, said brake having an engaged position wherein said brake arrests the operation of at least one of said rear wheels and a disengaged position, wherein said nest able wheelchair is slidably receivable underneath the seat of another such nestable wheelchair and wherein, when said nestable wheelchair is nested rearward of another such nestable wheelchair, said nestable wheelchair is configured such that only the brake of said nestable wheelchair prevents movement of the nested wheelchairs.

2. The nestable wheelchair of claim 1 further comprising a brake biasing member drivingly connected to the brake whereby the brake is biased to said engaged position, and a brake release member drivingly connected to the brake to move the brake to the disengaged position, the brake release member associated with the handle whereby the brake release member is operable to move the brake to the disengaged position at the same time as a person uses the handle to move the wheelchair and moving the brake of the rearward wheelchair to the disengaged position permits a person to move a plurality of nested wheelchairs.

3. The nestable wheelchair of claim 1 wherein said frame of said nestable wheelchair is rigid such that the wheelchair is not collapsible.

4. The nestable wheelchair of claim 1 wherein the seat is constructed from metal.

5. The nestable wheelchair of claim 2 wherein said brake release member is positioned rearwardly of the handle and is constructed to disengage the brake whereby displacing the brake release member forwardly to said handle.

6. A nestable wheelchair movable along the ground and having a front and a rear, said nestable wheelchair adapted to nest with a second such wheelchair by receiving the front of said second such wheelchair in the rear of said nestable wheelchair, said nestable wheelchair comprising:

(a) a frame having a forward portion having a front width and a rearward portion having a rear width wherein said rear width is larger than said front width;

(b) a seat mounted to said frame;

(c) front wheels mounted adjacent the front of said frame;

(d) rear wheels mounted adjacent the rear of said frame; and (e) a brake mounted to said frame, and movable between an engaged position in which said brake disables at least one of said wheels and a disengaged position, wherein the forward portion is configured to engage the rearward portion of a second such wheelchair when they are nested to lift the rear wheels of said second such wheelchair off the ground.

7. A nestable wheelchair movable along the ground and having a front and a rear, said nestable wheelchair adapted to nest with a second such wheelchair by receiving the front of said second such wheelchair in the rear of said nestable wheelchair, said nestable wheelchair comprising:

(a) a frame having a forward portion having a front width and a rearward portion having a rear width wherein said rear width is larger than said front width;

(b) a seat mounted to said frame;

(c) front wheels mounted adjacent the front of said frame;

(d) rear wheels mounted adjacent the rear of said frame;

(e) a brake mounted to said frame, and movable between an engaged position in which said brake disables at least one of said wheels and a disengaged position, wherein said frame comprises opposed side members and an engagement member extending therebetween, the engagement member having a forward engagement surface and a rearward engagement surface, the forward engagement surface of said nestable wheelchair engagable with the rearward engagement surface of a second such wheelchair to lift said rear wheels of said second such wheelchair when said nestable wheelchair is received by said second such wheelchair.

8. The nestable wheelchair of claim 6 wherein said engagement extends substantially horizontally and is configured to receive luggage.

9. The nestable wheelchair of claim 6 wherein said seat is pivotally mounted to said frame.

10. The nestable wheelchair of claim 6 wherein the front of said seat is pivotally mounted to said frame to allow said seat to rise to accommodate said second such wheelchair when said nestable wheelchair is nested with said second such wheelchair.

11. The nestable wheelchair of claim 6 wherein said frame is rigid.

12. The nestable wheelchair of claim 6 further including anti-tipping rollers mounted to said frame rearwardly of said rear wheels.

13. The nestable wheelchair of claim 12 wherein, when said nestable wheelchair is resting on said front and rear wheels on the ground, said anti-tipping rollers are positioned above the ground.

14. The nestable wheelchair of claim 6 wherein said rear wheels are separately journaled to the frame and the rearward portion defines an open space for nestably receiving a second nestable wheelchair.

15. The nestable wheelchair of claim 6 wherein said front wheels are mounted to said frames at a position forward of said seat.

16. The nestable wheelchair of claim 6 further comprising a footrest pivotally mounted to said frame forward of said seat.

17. A nestable wheelchair movable along the ground and having a front and a rear, said nestable wheelchair adapted to nest with a second such wheelchair by receiving the front of said second such wheelchair in the rear of said nestable wheelchair, said nestable wheelchair comprising:

(a) a frame having a forward portion having a front width and a rearward portion having a rear width wherein said rear width is larger than said front width;

(b) a seat mounted to said frame;

(c) front wheels mounted adjacent the front of said frame;

(d) rear wheels mounted adjacent the rear of said frame;

(e) a brake mounted to said frame, and movable between an engaged position in which said brake disables at least one of said wheels and a disengaged position; and (f) a pair of opposed arm rests pivotally mounted to said frame.

18. A nestable wheelchair movable along the ground and having a front and a rear, said nestable wheelchair adapted to nest with a second such wheelchair by receiving the front of said second such wheelchair in the rear of said nestable wheelchair, said nestable wheelchair comprising:

(a) a frame having a forward portion having a front width and a rearward portion having a rear width wherein said rear width is larger than said front width;

(b) a seat mounted to said frame;

(c) front wheels mounted adjacent the front of said frame;

(d) rear wheels mounted adjacent the rear of said frame;

(e) a brake mounted to said frame, and movable between an engaged position in which said brake disables at least one of said wheels and a disengaged position; and (f) a locking mechanism for releasably coupling said wheelchair to a second such wheelchair, wherein said locking mechanism is coin operated.

19. A nestable wheelchair movable along the ground and having a front and a rear, said nestable wheelchair adapted to nest with a second such wheelchair by receiving the front of said second such wheelchair in the rear of said nestable wheelchair, said nestable wheelchair comprising:

(a) a frame having a forward portion having a front width and a rearward portion having a rear width wherein said rear width is larger than said front width;

(b) a seat mounted to said frame;

(c) front wheels mounted adjacent the front of said frame;

(d) rear wheels mounted adjacent the rear of said frame;

(e) a brake mounted to said frame, and movable between an engaged position in which said brake disables at least one of said wheels and a disengaged position; and (f) a seatback rigidly mounted to said frame, wherein said seat back includes a carry basket.

* * * * *